UNITED STATES PATENT OFFICE.

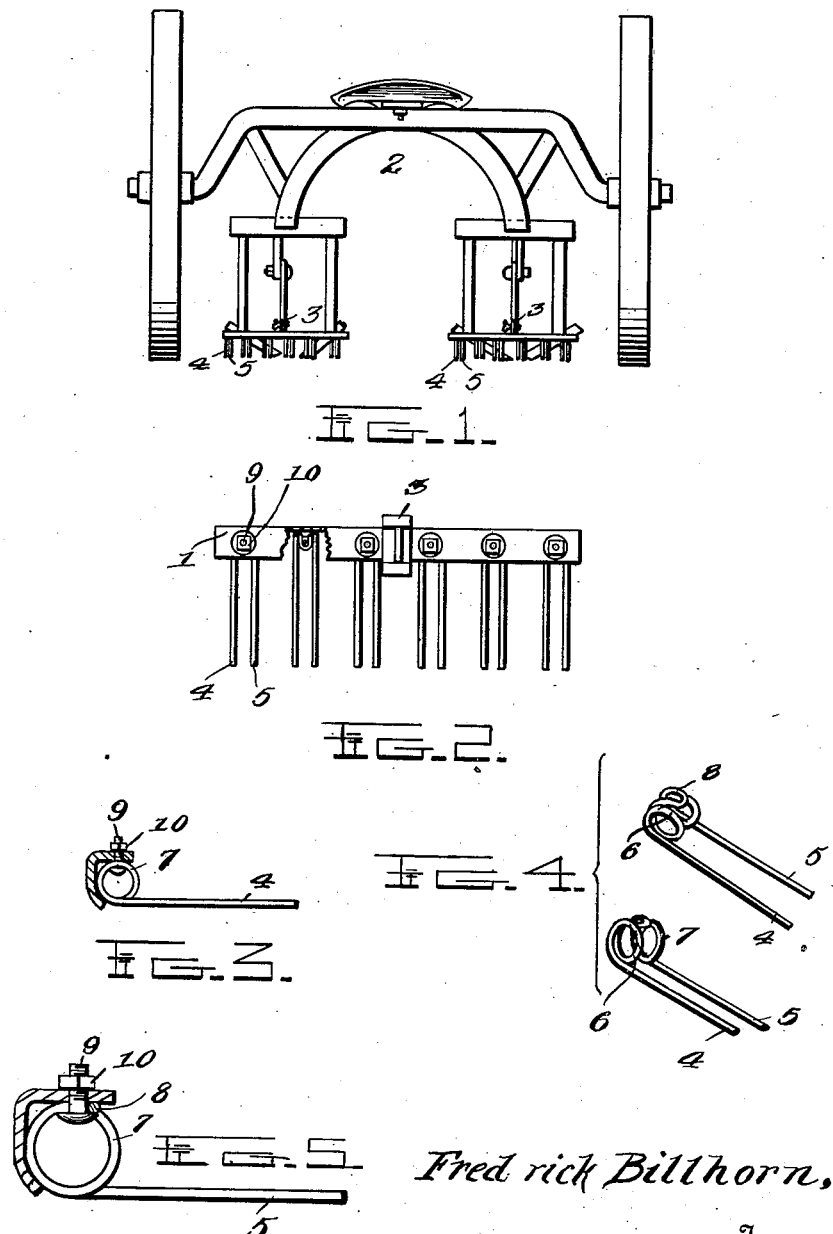

FREDRICK BILLHORN, OF MENDOTA, ILLINOIS.

AGRICULTURAL IMPLEMENT.

1,086,015.

Specification of Letters Patent.

Patented Feb. 3, 1914.

Application filed July 24, 1913. Serial No. 780,953.

*To all whom it may concern:*

Be it known that I, FREDRICK BILLHORN, a citizen of the United States, residing at Mendota, in the county of La Salle and State of Illinois, have invented certain new and useful Improvements in Agricultural Implements, of which the following is a specification.

The present invention relates to improvements in agricultural implements and applies especially to an improved form of toothed rake for that class of implements known as surface cultivators.

The primary object of the invention is the provision of a rake for attachment to a cultivator to follow the cultivator teeth, and is dragged over the ground to level and pulverize the surface soil at the rear of the cultivator teeth.

The invention consists in certain novel combinations and arrangements of parts by means of which the teeth of the rake are secured to the rake head, and in the novel form of the teeth, as will be further pointed out hereinafter.

In the accompanying drawings I have illustrated one complete example of the physical embodiment of my invention constructed according to the best mode I have so far devised for the practical application of the principles thereof.

In the drawings Figure 1 is a rear elevation of so much of a riding cultivator as is necessary to illustrate the adaptation of my invention thereto. Fig. 2 is a plan view, partly broken away of the rake portion of the device. Fig. 3 is a transverse vertical section of the rake head showing a tooth attached. Fig. 4 shows two perspective views of the double tooth detached. Fig. 5 shows an enlarged detail with the rake head in section and the double spring tooth also in section.

In the embodiment of the invention as illustrated in the drawings I employ the angle iron 1 as the rake head, and the head may be attached to a suitable part of the cultivator by the conventional form of bracket 3 attached to the rake head.

The teeth of the rake are fashioned in pairs and each comprises a prong 4 and its mate 5. These prongs form a double tooth, and the double tooth is fashioned of a single integral piece of spring steel, a coil 6 being formed at the top of the prong 4 and a similar coil 7 being formed at the top of the prong 5. These two coils are connected by a single loop 8, by means of which the double tooth is fastened to the angle iron by a bolt 9 passed through one of the angle iron plates, and a nut 10. It will be noted that one of the plates of the angle iron rake head is curved to conform to the curvature of the coils 6 and 7 of the double teeth, and the plate thus forms a seat to protect the coils or springs of the teeth. The bolts 9 are passed upwardly through the perforated angle plate and loop 8 of the double tooth, and by means of the nut the double tooth is securely held to the rake head. From this construction it will be evident that I reduce the number of bolts and nuts required, because of the fact that the double tooth requires only one attaching bolt, instead of two bolts as is the case with independently formed teeth. The curved plate of the angle iron forms an effective seat and protection for the coils of springs of the teeth, and it will be noted that each tooth of the rake is allowed an elastic springy action, both lateral and vertical, and independent of the other teeth. This elasticity of the teeth produces a better pulverizing action on the soil and permits the teeth to let go of trash and rubbish. The number of double teeth to be attached to the rake head may be varied, and the size and strength of the teeth may be varied to suit circumstances, as for instance the device is capable of use as a cultivator, and when so used the teeth are of considerably thicker material.

Having thus fully described my invention, what I claim and desire to secure by Letters Patent is:—

1. The combination with a rake head including an angle bar having a perforated plate and a curved plate, of a series of integral double teeth bolted to said perforated plate and comprising a pair of spaced parallel tines, and each tine formed with a spring coil seated in said curved plate.

2. The combination with a rake head including an angle bar having a perforated plate and a curved plate, of a series of integral double teeth each formed with a loop and a bolt securing said loop to the perforated plate, and each of said teeth provided with a pair of spring coils seated in the curved plate.

In testimony whereof I affix my signature in presence of two witnesses.

FREDRICK BILLHORN.

Witnesses:
WM. C. LADD,
WILLIAM LUCAS.

Copies of this patent may be obtained for five cents each, by addressing the "Commissioner of Patents, Washington, D. C."